UNITED STATES PATENT OFFICE.

CARL AUER VON WELSBACH, OF VIENNA, AUSTRIA-HUNGARY.

PROCESS OF OBTAINING ZIRCONIUM NITRATE.

SPECIFICATION forming part of Letters Patent No. 409,653, dated August 20, 1889.

Application filed December 22, 1887. Serial No. 258,749. (No specimens.) Patented in England July 29, 1886, No. 9,806.

*To all whom it may concern:*

Be it known that I, CARL AUER VON WELSBACH, a subject of the Emperor of Austria-Hungary, residing at Vienna, in the Empire of Austria-Hungary, have invented a new and useful Improvement in the Method of Obtaining Compounds of the Rarer Metals from their Earths for Use as Incandescent Bodies for Illuminating Purposes, (for which I have obtained a patent in Great Britain, dated July 29, 1886, No. 9,806,) of which the following is a specification.

This invention relates to the production of zirconium in a form suitable for an incandescent body, or for one of the main constituents of such a body; and it consists in a novel method of treatment, whereby the metal is produced in the form of zirconium nitrate, as fully hereinafter described, and pointed out in the claim.

In carrying out my invention I proceed substantially in the manner following: In treating zirconium this is reduced to about the size of peas, heated to a white heat under free admission of air, pulverized and levigated, and is then digested for several days with concentrated hydrochloric acid for the purpose of removing all traces of iron. The original brownish-gray powder is by this means converted into a perfectly white powder and many of the impurities originally contained in the zirconium crystals are dissolved. The fine zirconium powder is then washed and dried and is mixed with double the quantity of calcined carbonate of soda, and after being ground fine it is subjected to a white heat for about three hours in a platinum crucible. The cakes of soda-melt thus obtained are placed in cold clean water, when a fine white powder will be precipitated, while numerous bodies that are not useful for the purposes of the invention pass into the mother-liquor. The white powder is washed in water, dried, and treated with sulphuric acid under trituration until a sample, heated on platinum, clearly shows an excess of sulphuric acid. The decomposition of the white powder by sulphuric acid takes place under considerable heating, and care must be taken that the acid is very gradually added, (the powder remaining perfectly dry,) as otherwise a scattering of the mass will ensue. The powder is then heated to the boiling-point of the sulphuric acid, whereby the greater part of the excess of acid will be driven off. After cooling, the powder is mixed with a large quantity of cold water under stirring, whereby the zirconium will be dissolved as sulphate together with other bodies. The undissolved precipitate is unconverted zirconium and silicic acid. This is separated by filtration and washed. The before-mentioned solution of zirconium sulphate is precipitated by ammonia in the cold and is washed. If this material be now dissolved in nitric acid, so that no considerable excess of acid occurs, a brilliant white powder will after a short time be precipitated, which is a peculiar combination of zirconium, containing this metal in an almost chemically-pure condition. The impurities—such as iron, alumina, &c.—remain in the lye. This reaction is based on the fact that a small quantity of sulphate of ammonia present in a solution of nitrate of zirconium effects the separation of the before-mentioned compound, completely so when heated, and particularly when cold. As an excess of sulphate of ammonia dissolves the zirconium precipitate, this is to be avoided.

The precipitate containing the zirconium is almost insoluble in water, but soluble in nitric acid when freshly precipitated. When digested with ammonia, it is rapidly converted into dense zirconium hydroxide, which is readily separated by washing. This body is then dissolved in concentrated nitric acid and the solution is evaporated on a water-bath, producing clear gum-like crusts consisting of zirconium nitrate.

The presence of small quantities of iron, such as are contained in the preparation of zirconium heretofore made, is very detrimental to the action of the incandescent body.

Having now particularly described and ascertained the nature of my said invention and in what manner the same is to be performed, I declare that what I claim is—

The method, substantially as hereinbefore described, of producing zirconium nitrate in a form suitable for an incandescent body by first converting the zirconium into a sulphate, and, after treating with ammonia, dissolving the same in nitric acid, thereby obtaining a precipitate which, when digested with ammonia and dissolved in nitric acid and evaporated, produces zirconium nitrate.

In testimony whereof I have signed my name to this specification, in the presence of two subscribing witnesses, this 18th day of October, A. D. 1887.

CARL AUER VON WELSBACH.

Witnesses:
 OLIVER IMRAY,
*Patent Agent, 28 Southampton Buildings, London, W. C.*
 WALTER J. SKERTEN,
*17 Gracechurch Street, London, E. C.*